United States Patent [19]

Schabowski

[11] Patent Number: 4,479,178
[45] Date of Patent: Oct. 23, 1984

[54] QUADRUPLY TIME-MULTIPLEX INFORMATION BUS

[75] Inventor: John Schabowski, Houston, Tex.
[73] Assignee: Texas Instruments Incorporated, Dallas, Tex.
[21] Appl. No.: 279,878
[22] Filed: Jul. 2, 1981
[51] Int. Cl.³ ............................................. G06F 9/30
[52] U.S. Cl. .................................................. 364/200
[58] Field of Search ... 364/200 MS File, 900 MS File

[56] References Cited

U.S. PATENT DOCUMENTS

4,161,788  7/1979  Rosenblum ........................ 364/900
4,286,321  8/1981  Baker et al. ....................... 364/200

*Primary Examiner*—Thomas M. Heckler
*Attorney, Agent, or Firm*—Melvin Sharp; N. Rhys Merrett; Thomas E. Tyson

[57] ABSTRACT

A quadruply time-multiplexed bus for digital processor systems. The quadruply time-multiplexed information bus is interfaced to a processor and an external memory to transfer addresses, data and program instructions between the processor and the external memory. The interface at the external memory includes the capability to store the addresses of extended bus or instructions being accessed. These stored addresses may be modified from the processor by the processor transmitting new addresses over the information bus or by having the processor activate selected control signals in the information bus interface which causes the stored address to be modified in response to the control signals. This feature is useful to read a new instruction from external memory without the requirement of a new transmission of program instruction address every time a new instruction is fetched by the processor.

7 Claims, 7 Drawing Figures

QUADRUPLY TIME-MULTIPLEX INFORMATION BUS

CROSS REFERENCE TO RELATED APPLICATION

This application is in the same subject area as application Ser. No. 279,881 also assigned to Texas Instruments.

BACKGROUND OF THE INVENTION

1. Field of the Invention

This invention relates to data transfer between digital processing systems and external peripheral devices, digital processing systems in general and computer systems.

2. Description of the Prior Art

Digital processors communicate with the external world through many means, such as interrupts, direct memory access (DMA) and programmed input/output (I/O) ports. For digital processors contained on a single chip or semiconductor substrate, the interface to the external world becomes more difficult because of the limited number of pins available on the chip package for this interface. Many schemes have been used to circumvent the problem of limited pins. One technique is to use the same I/O lines for both data and address. An extension of the technique is to use only 8 lines for 16 bits of data and 16 bits of address information. The 16 bit information is divided into two parts of 8 bit bytes. The most significant byte, the 8 bits contained in the upper part of 16 bit words, are normally transmitted first followed by the least significant byte, the 8 bits in the least significant portion of the 16 bit word. For a 16 bit memory access then, the sequence would be to send first the most significant 8 bits of the address by the least significant bits of the address. Then on the same bus the data would be sent by sending the first most significant 8 bits of the data then the least significant 8bits. While this technique solves the problem of memory access with a limited number of pins in the interface, it does so in a manner that requires more time than would be required for a single 16 bit transmission over 16 parallel data lines. Thus the first technique requires four cycles whereas the second technique requires only two. The first technique is therefore referred to as "quadruply time-multiplexing".

SUMMARY OF THE INVENTION

In accordance with the present invention, a digital processor system including a quadruply time-multiplexed information bus is provided. The system includes a processor that is interfaced to an external memory through the quadruply time-multiplexed information bus. This information bus interface allows the processor to send addresses to the external memory in order to fetch data from the memory or to store data into the memory. In addition, the processor may modify the addresses used in memory transfers by use of control signals in the information bus interface.

In one embodiment of this invention, the external memory interface to the quadruply time-multiplexed information bus includes a register to store the addresses that are received from the processor. These addresses are the addresses of data that is being accessed by the processor. This data will be transmitted over the information bus back to the processor. To modify the addresses stored in the memory interface, the processor may transmit new addresses to the memory. However, this invention will allow the processor to modify the contents of the address register by activating a selected control signal which causes the memory interface to modify the address stored. As an example of an application of this feature, the external memory may be used to store a program to be executed in the processor. The processor accesses the instructions contained in the program by transmitting the instruction address over the information bus to the external memory. The transmission of the address is followed by the transmission of the instruction data by the external memory. However, using a selected control line, a processor may cause the address previously stored in the external memory interface to be incremented, thus saving the step of transmitting the new address over the information bus. Therefore, instead of having a memory cycle that consist of address and data, the memory cycle would only include the transmission of data since the address had been modified and stored in memory in response to the selected control signal.

In a further embodiment of this invention, the external memory interface includes data address register and a program counter register. In this embodiment, the current program counter address is stored in both the processor and the external memory interface. The program counter in the processor is incremented according to the internal microcode of the processor and in addition, this microcode causes a selected control signal in the information bus interface to increment the program counter register in the external memory interface. In addition the data address register is the register used to maintain the address of data being accessed. Determining which register is used to access information in the memory array within the external memory is accomplished by using the signal that increments the program counter register to select the program counter register as the address for the memory access. Other selected control signals are activated when it is desired to change the contents of the program control register or the contents of the address register in order to load new addresses of data or new addresses of program instructions.

DETAILED DESCRIPTION OF THE INVENTION

Figure 1:
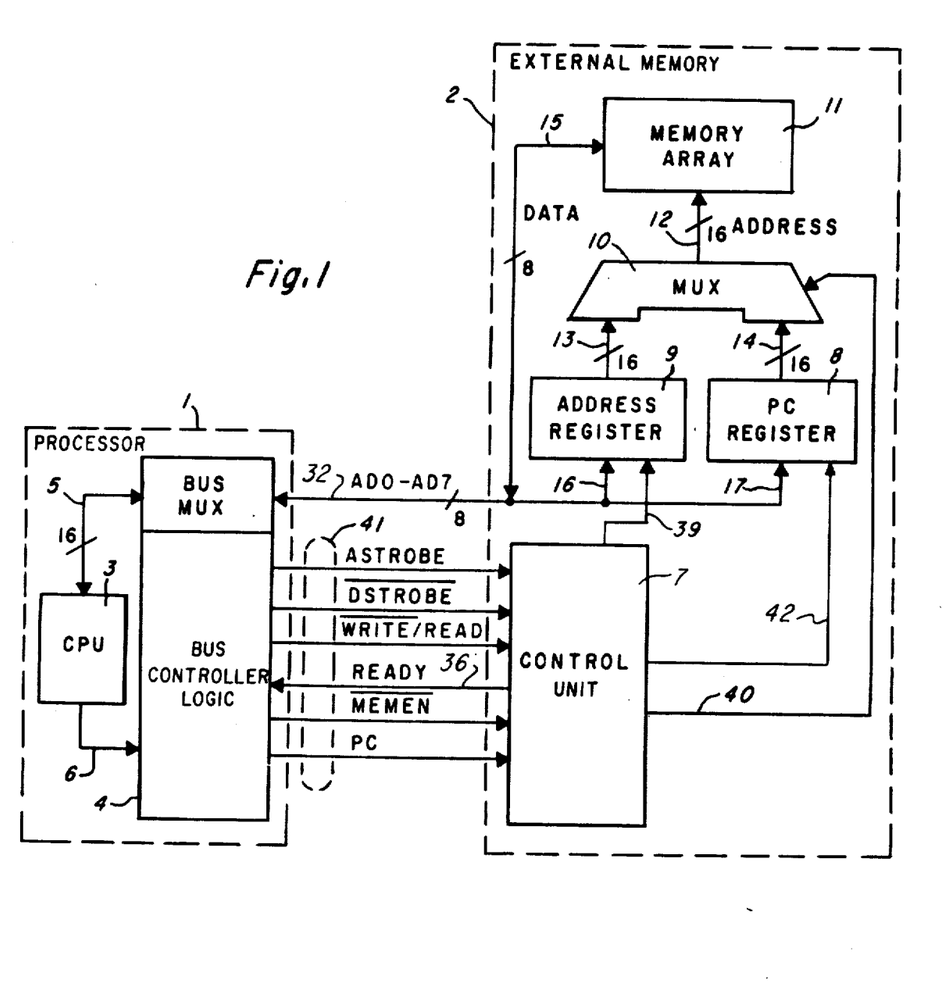
FIG. 1 is a block diagram showing an interface between a processing unit and an external memory.

FIG. 1 illustrates a processor 1 interface to an external memory 2. This type of configuration is often required by processors that do not have sufficient memory storage within the processor's system itself. Th processor 1 can be either a series of printed circuit boards, a single printed circuit board or even a single integrated semiconductor chip. Likewise, the external memory 2 can be a series of printed circuit boards, a single board, or a single chip. In this configuration, the interface between the processor 1 and the external memory 2 becomes important. In FIG. 1, the interface between the processor 1 and the external memory 2 comprises 8 address and data lines AD0 through AD7 and 6 control lines 41 consisting of ASTROBE, $\overline{\text{DSTROBE}}$ WRITE/READ, READY, $\overline{\text{MEMEN}}$ and PC.

Referring now to the processor unit 1, the processor unit consist of a central processing unit 3 and the interface information bus multiplexer and multiplexer control 4 connected to the address data lines AD0-AD7 and the control lines 41. The information for the bus multiplex orginates from CPU 3 and is transmitted to the bus multiplex 4 over data lines 5. Likewise the bus control lines 41 originating from the bus control section 4 are originated from CPU 3 and transmitted by line 6.

The external memory 2 contains the control interface to the processor unit 7 which receives and responds to the control signals from the processor and in a similar manner, sends the control line READY to the processor. In addition the external memory 2 contains a memory array 11 with address registers 9 and PC register 8. Address register 9 is a general purpose address register and PC register 8 is the program counter register which has the specific purpose of storing the program count for the memory acquisition of program instructions. These two registers 9 and 8 are connected to a multiplexer, MUX 10 through lines 13 and 14, respectively. The MUX 10 selects one of the two registers, 9 and 8, and transmits the contents of that register over line 12 to the memory array 11 in order to address a portion of the memory array 11. The contents of the memory array 11 are then placed on the data lines 15 and transferred back over the interface to the processor unit 1 via the data lines AD0 to AD7. The multiplexer selects the address according to the control line 40 which is connected to the multiplex bus control circuitry 7 in the external memory 2.

The addition of the PC register 8 in the external memory 2 allows the processor unit 1 to access the external memory 2 without repetitively transmitting addresses to read and write data into memory. When the program is first accessed the program counter 8 is loaded from the AD0-AD7 bus via line 17 using the ASTROBE and PC control lines. The program counter (PC) Register 8 contents is used to address the first program instruction which is transmitted to processor 1 on the AD0-AD7 via line 15 upon the occurance of $\overline{\text{DSTROBE}}$. TO access the next instruction in memory, the external memory 2 is accessed with the PC and $\overline{\text{DSTROBE}}$. Every occurence of $\overline{\text{DSTROBE}}$ (i.e., the falling edge) will increment either the address register 9 or the PC register 8. If the PC line is high, the PC register 8 will be incremented. If the PC line is low, then the address register 9 will be incremented. By the same manner each sequential instruction is accessed in the program, i.e., without the prior transmission of the program instruction address. Therefore, a sequence which would conventionally require four access cycles now only requires two access cycles. If the instruction executed is a branch or jump instruction, the PC register 8 must be loaded with a new program address. This is accomplished as before by loading the new program address over the AD0-AD7 bus to the program counter register 8 via line 17 using the PC and ASTROBE control line.

To examine the implementation of this technique, one must look at both the processor unit 1 and the external memory 2 individually and collectively.

Figure 2:
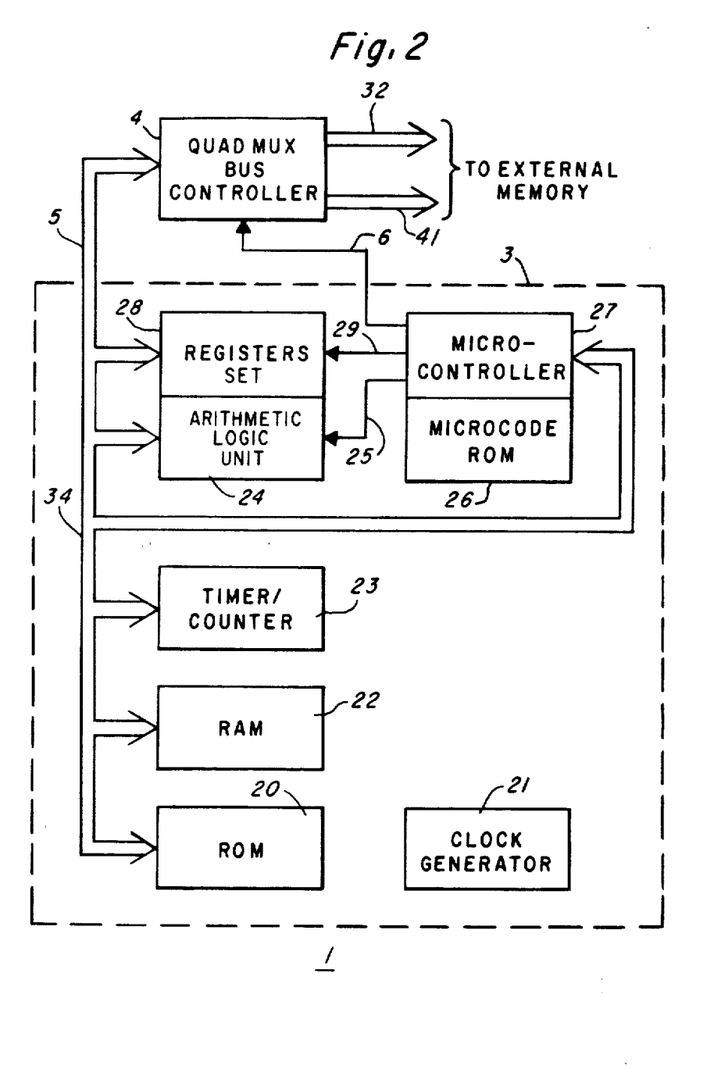
FIG. 2 is a block diagram of the processing unit.

FIG. 2 illustrates the contents of the processor unit 1. The central processing unit 3 is illustrated as containing certain common elements. It should be noted that the elements contained in FIG. 3 may differ from central processing unit to central processing unit. However, for this example the central processing unit contains a general register set 28 connected to an arithmetic logic unit 24. The register set 28 is controlled by a microcontroller 27 over the control lines 29. The arithmetic logic unit 24 is controlled by the microcontroller 27 over line 25. The microcontroller receives an instruction from either the ROM 20 or from the internal bus 34. This instruction designates a set of microcode contained in the microcode ROM 26. The microcode in turn determines the control of the different elements to which the microcontroller is connected. In addition, the central processing unit 3 is shown to contain a timer/counter 23, a RAM 22 and a ROM 20 connected to the data bus 34. A clock generator 21 is also shown to provide timing for the internal operation of the central processing unit 3. The data bus 34 is connected to data bus 5 which is input into the quadmultiplex bus controller 4. In addition, the quadmultiplex bus controller 4 receives control signals from the microcontroller 27 via line 6. The quadmultiplex bus controller 4 interfaces to the external memory through lines 32 representing the address bus AD-0 to AD-7 shown in FIG. 1 and lines 31 which represent the control lines shown in FIG. 1. In addition, line 36 is input into the quadmultiplex bus 4 from the external memory.

Figure 3:
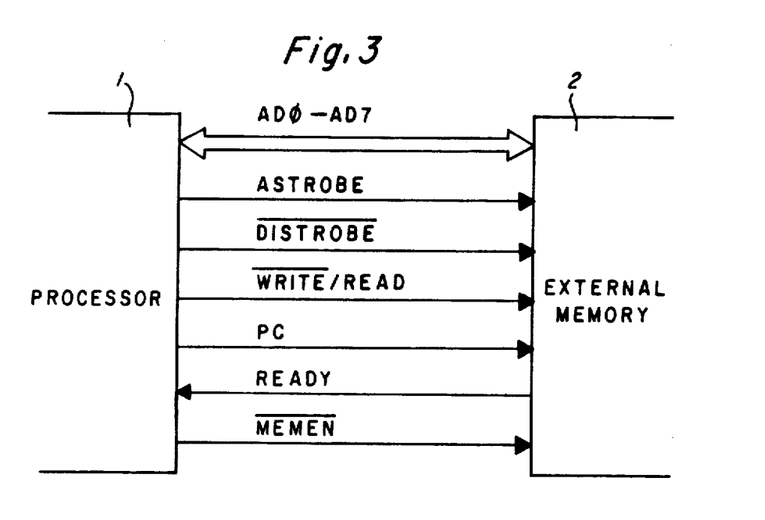
FIG. 3 illustrates the signals that comprise the interface between the processor unit and the external memory.

These control lines and address lines are further shown in FIG. 3. The uppermost set of lines are AD-0 to AD-7 representing the information bus that transfers 8 bits of information between the processor 1 and the external memory 2. These lines may transfer addressed data in either direction. AD-0 represents most significant bit of a byte that is being transferred. Below this information bus is the control line ASTROBE. ASTROBE represents the address strobe and is high when an address is placed on the information bus AD-0 to AD-7. The control line beneath ASTROBE is $\overline{\text{DSTROBE}}$ which represents the data strobe. Data strobe is an active low signal which is active when data is present on the information bus, AD-0 to AD-7. The control line below $\overline{\text{DSTROBE}}$ is $\overline{\text{WRITE}}$/READ. $\overline{\text{WRITE}}$/READ determines whether the data contained on the information bus AD-0 to AD-7 is being written into external memory 2 or read from external memory 2. The next control line is PC which represents the program counter addressing. PC is active or high for every external memory READ cycle for which the program counter is used as the address for the READ. The next control signal is transmitted from external memory 2 to the processor 1 and is the READY signal. READY is active high when the present external memory cycle is ready to be completed. That is, the data on the information bus AD-0 to AD-7 is being read or written. When the ready line is low during the memory access, the processor will then enter a WAIT condition and wait for the READY line to go high before the memory access is completed. The control line at the bottom on FIG. 3 is $\overline{\text{MEMEN}}$ or MEMORY ENABLE. When active low, memory enable indicates that the information bus AD-0 to AD-7 is being used for an external memory cycle. These control lines 41 regulate the transfer of information over the information bus AD-0 to AD-7 between the processor 1 and external memory 2.

Figure 4:
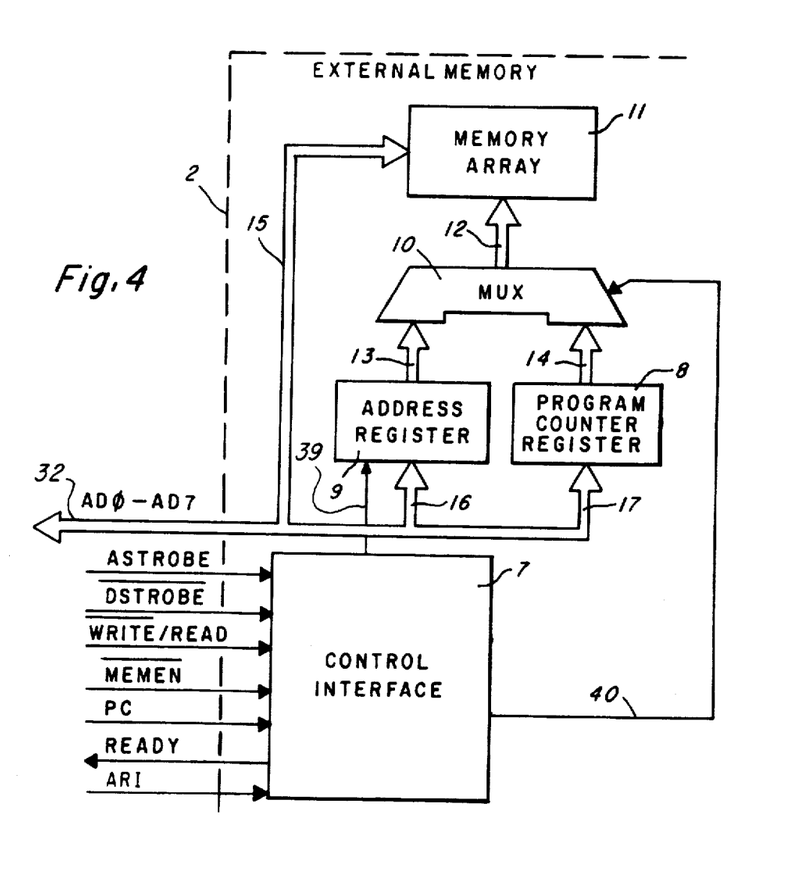
FIG. 4 is the block diagram of the external memory showing its interconnection with the interface to the processor.

FIG. 4 illustrates the contents of the external memory 2, and more particularly its interface to the processor 1. The control lines from the processor 1 and in the case of the READY signal to processor 1, are shown connected to the control interface 7. The control interface regulates the actual reading and writing of data by the external memory 2 onto the information bus AD-0 to AD-7. In addition in response to the PC control line, line 40 becomes active to switch the addressing for the memory array 11 from the address register 9 to the program register 8 to allow the proper address to be placed to the memory array 11 in order to have the destination operand either read or written from the data bus AD-0 to AD-7 and line 15 connected to the memory array 11. Line 42 provides the increment signal when the PC line is active and the $\overline{\text{DSTROBE}}$ goes from low to high.

Figure 5:
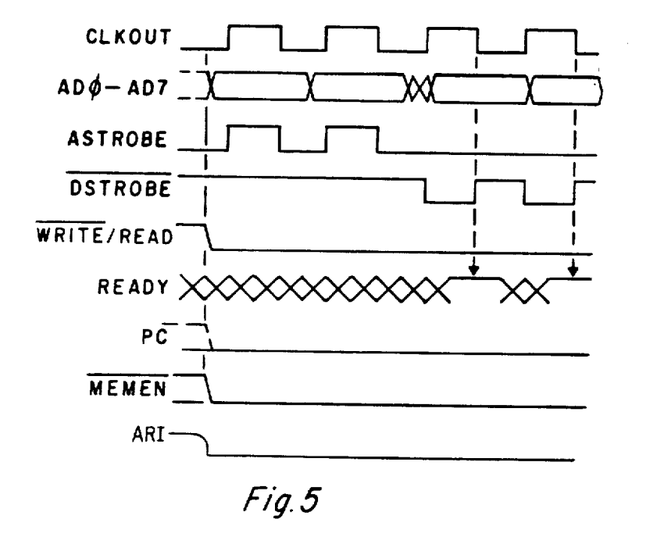
FIG. 5 is a timing diagram of the read cycle for the external memory.

FIG. 5 illustrates two types of memory read cycles. The first type designated as part A begins upon the rise of clock out (CLKOUT) when the first byte of the address is placed on the AD-0 to AD-7 information bus. The address stobe line (ASTROBE) becomes high during this clock phase. The data strobe ($\overline{\text{DSTROBE}}$) remains high and inactive. The $\overline{\text{WRITE}}$/READ line goes low to signify a write, that is the address is being written into the address register. The READY line is in a don't care state. During the access of program instructions, the PC line would become high to enable the address contained on the information bus AD-0 to AD-7 to be loaded into the PC register 8 over line 17. If the PC line is low, the address contained on the information bus AD-0 to AD-7 is to be loaded via line 16 into the address register 9. The memory enable ($\overline{\text{MEMEN}}$) line in FIG. 5 becomes low active during any memory access. The contents of AD-0 to AD-7 after two bytes of information are placed on the bus, the bus is placed into a receive state from the processor side signified by time indication 45 and 46. Actually, bytes of information are being obtained from the memory during these two times, 45 and 46. Note also that the ASTROBE line is inactive and the $\overline{\text{DSTROBE}}$ line is active during the time when the data is placed on the information bus AD-0 to AD-7. The $\overline{\text{WRITE}}$/READ line is high indicating a read operation. At the same time, the READY line is high to indicate that the data contained on the information bus AD-0 to AD-7 is ready to be read into the processor. If the data being sent during a read operation from the external memory 2 is in response to the PC register 8 address, then the PC line is high.

Part B of FIG. 5 shows a memory read where the response of the external memory 2 is slower than in Part A. In particular, note indications 47 and 48 which indicate that the READY line is low during the memory access. At this point the data contained on the address bus AD0-AD7 is not read. Instead at the next fall of the clock at indication 49 and 50 the data is read.

Figure 6:
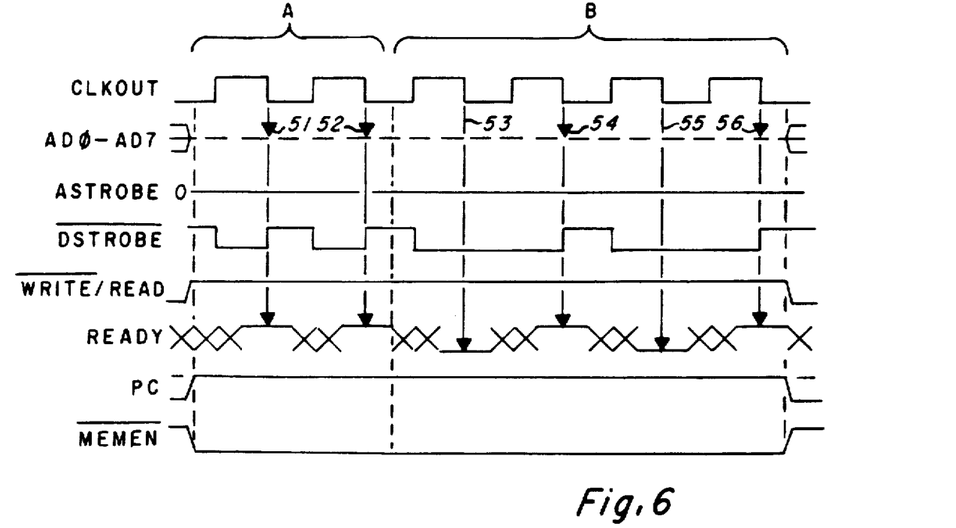
FIG. 6 is a timing diagram for a memory Read cycle showing the feature where the program contained in the external memory is used to provide the address for the data.

FIG. 6 illustrates a memory read where the address is not placed on the information bus AD-0 to AD-7. In part A indication 51 and 52 denote the time in which the data from the external memory 2 is placed on the information bus AD-0 to AD-7. Note that there is no address strobe during the whole cycle and that only the data strobe is present to signify the transfer of data. The absence of the address strobe with the PC active will cause the program counter contents to be inactive. The occurrence of $\overline{\text{DSTROBE}}$ with the PC line high will increment the PC register 8. The $\overline{\text{WRITE}}$/READ line is high to signify that the data is being read from the external memory to and the READY line is high signifying the availability of the data on the bus AD0 to AD7 at the specified times. The PC line is high to signify that the data being read is data that has been addressed by the PC register 8 in the external memory. The memory enable line is active low as previously discussed. In part B the ready line is dropped for the 1st and 3rd attempts at memory access designated by lines 53 and 55, respectively, to signify the ability for the processor to wait until the ready line is high. The ready line then appears high on lines 54 and 56, respectively, signifying a data access or data read by the processor unit 1 from the external memory 2 over the information bus AD-0 to AD-7.

The true benefit of this invention can be seen clearly by comparing FIG. 6 with FIG. 5. In comparison of FIG. 5 part a with FIG. 6 part a, one can see that FIG. 6 part a takes one-half the time that FIG. 5 part a takes to complete the same transaction. Therefore, by having the program counter register 8 loaded with the address in a prior memory access and then incrementing that address, the transfer of the program instruction can take place in one-half the amount of time that it would take place in conventional-type systems.

Figure 7:
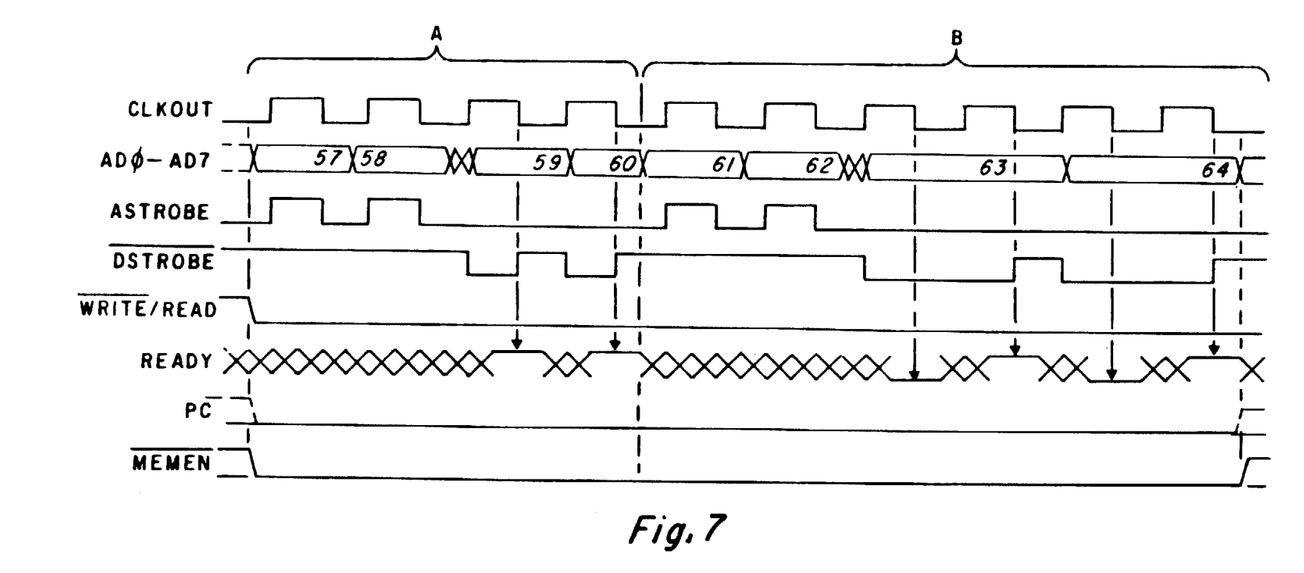
FIG. 7 illustrates a timing diagram for a Write to the external memory from the processor.

FIG. 7 illustrates a write into memory. Part A illustrates a memory write where the processor 1 places the address on the information bus AD-0 to AD-7 as shown by 57 and 58 followed by the data 59 and 60. Part B illustrates the same type of transfer except with the wait state. The address is sent as before at 61 and 62. However, the data 63 takes twice as long because of the READY line being low at the end of the first access and high during the second access illustrated by data word 63 and 64. Note that the processor unit 1 maintains the data on the information bus AD-0 to AD-7 until the ready line is high.

What is claimed is:

1. A digital processor system comprising:

memory, means for storing of information;

processor means for entering and extracting information from the memory means under the control of a predetermined program sequence;

interface means coupled between said processor means and memory means for providing a conduit for information transfer said interface means comprises;

control means, responsive to said processor means, for providing at least a first control signal having a first state and a second state;

information bus means for transferring of data and program information between said processor means and said memory means under the control of the processor means and memory addressing means including an address register responsive to the control signal when at a first state and a program counter register responsive to the control signal is incremented when the control signal is at a second state, the address register addresses the memory means for the entering or retrieving of data information and the program counter addresses the memory means for the entering and retrieving of program information; and control bus means for transferring of at least the first control signal between said processor means and said memory addressing means.

2. The digital processor system according to claim 1, wherein said memory means includes a memory read and memory write capability.

3. The digital processor system according to claim 1, where in said information bus means transfers address information and program and data information on the same information bus lines.

4. A digital processor system according to claim 3, wherein said information bus means transfers 16 bits of information in two separate 8 bit transfers.

5. The digital processor system according to claim 1 wherein said memory addressing means comprises: a switching means for selecting either said address register or said program counter register to provide the address to the memory means for the information to be accessed, said switching means being responsive to said control means.

6. A digital processor system according to claim 5, wherein said control means includes an address strobe signal an a data strobe signal both coupled to said switching means and further including a program counter increment signal coupled to said program counter register.

7. A digital processor system according to claim 6, wherein said control means further comprises a read/-write signal.

* * * * *